June 15, 1937.  J. E. MARSDEN  2,084,156
EMULSIFYING AND CREAM MAKING DEVICE
Filed Aug. 14, 1936
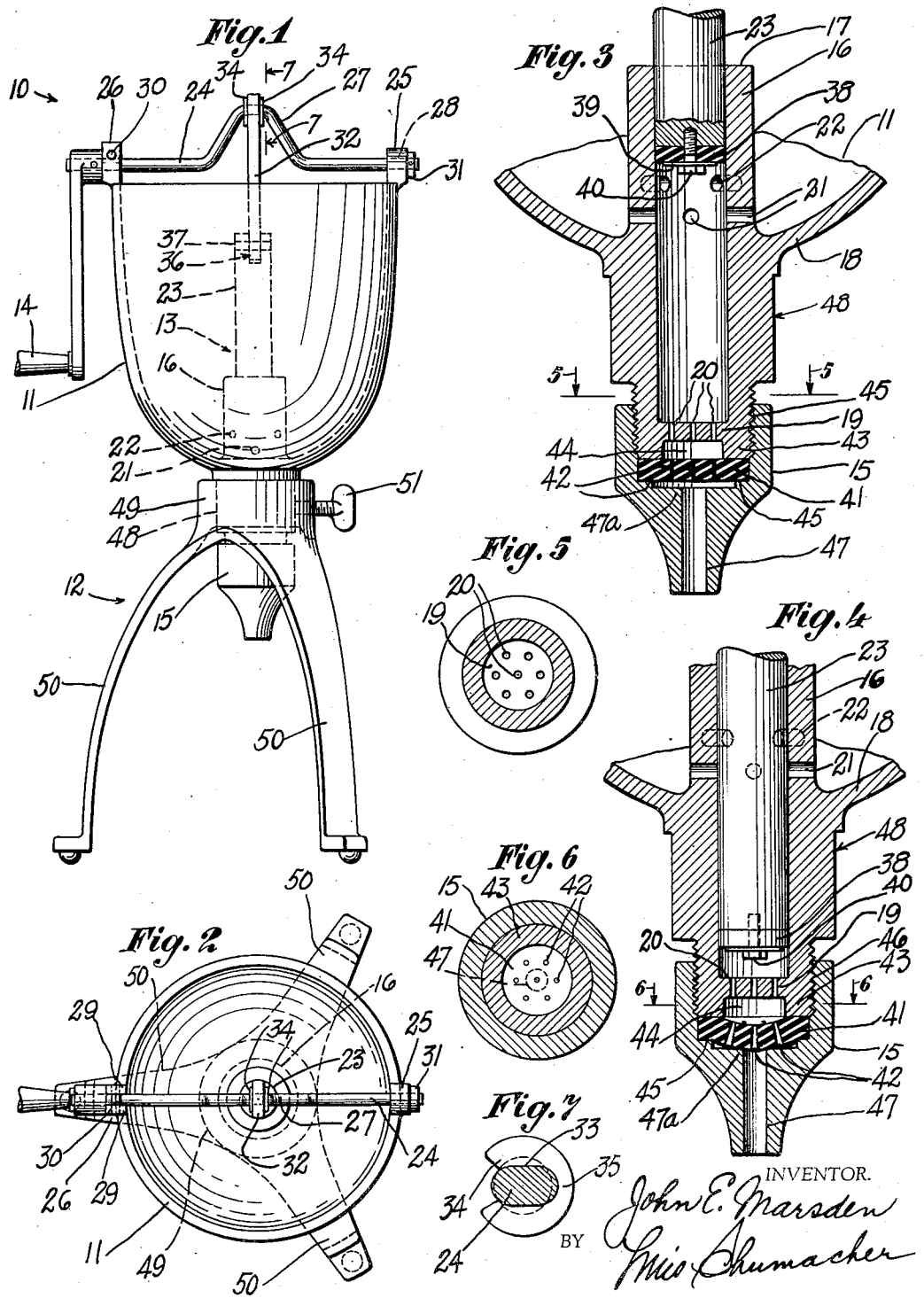

Patented June 15, 1937

2,084,156

UNITED STATES PATENT OFFICE 2,084,156

EMULSIFYING AND CREAM MAKING DEVICE

John E. Marsden, Philadelphia, Pa.

Application August 14, 1936, Serial No. 96,027

5 Claims. (Cl. 99—267)

This invention relates to devices for producing emulsions, as for the purpose of making cream, and also to methods of making emulsions.

One object of this invention is to provide a device of the character described having improved means of a particularly simple type for producing finely emulsified mixtures, whereby such mixtures shall remain emulsified indefinitely or for such a long period of time as may be necessary.

Another object of the invention is to provide a device of the nature set forth having a foraminous like device, which, while preferably immovable, may be relatively yieldable, if desired, and which device shall cause an intimate division and commingling of materials; and another object is to furnish a resiliently self closing apertured or screen like element in a device for the purpose mentioned.

Another object of the invention is to provide improved means for the intermixing and emulsification of liquids in stages.

Another object of the invention is the provision of improved emulsifying means for causing an effective agitation of the mixture that is to be emulsified; and improved means to cause particles of a gas such as air to be intermingeld with the mixture in a finely divided condition.

A further object of the invention is to furnish a device of the class alluded to having relatively few and simple parts, and which is inexpensive to manufacture, convenient and rapid for use and for cleaning the same, and durable, compact, neat, and efficient to a high degree.

A still further object is to provide an improved method for emulsifying a mixture, and particularly for producing cream from a mixture of butter and a thinning liquid such as milk.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

Figure 1 is a view in elevation showing a device embodying the invention.

Fig. 2 is a top plan view thereof.

Fig. 3 is an enlarged fragmentary sectional view of the device, showing the same in its initial unoperated position.

Fig. 4 is a similar view of the device in fully operated position at the end of a compression stroke of the piston.

Fig. 5 is a horizontal transverse sectional view taken on the line 5—5 of Fig. 3.

Fig. 6 is a horizontal transverse sectional view taken on the line 6—6 of Fig. 4.

Fig. 7 is an enlarged sectional view taken on the line 7—7 of Fig. 1.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Generally described, and according to one purpose to which the invention may be applied, I provide a device including a container or bowl for receiving a mixture of milk and melted butter, and adapted to supply the mixture to a suitable pump. The latter is so constructed as to cause a circulation and effective agitation of the liquids in the container, and to simultaneously expel a portion of the mixture to the emulsifying device. Differently stated, the pump may abstract and thoroughly commingle a portion of the container contents, and then expel such portion to the emulsifying device. The pump may also cause a quantity of air to be intermingled with the mixture to facilitate the agitation and emulsification, and to enhance the creamy appearance of the product. The emulsifying device desirably consists of means operating in successive stages to cause an initial and a final emulsification or to prepare the liquid mixture for emulsification. Hence I cause the liquid mixture to be driven by the pump first through a screen like element and then through a valvular part, which, however, does not require movement such as that of a valve, and which is relatively incapable of clogging or getting out of order. The part referred to may have one or more openings, and may be a screen like element whose openings are rather fine and much smaller than those of the first stage element. Desirably, I use a resiliently self closing body which may consist of metal or rubber, preferably the latter, and which is supported so as to be flexed by pressure to open the normally closed openings therein. Dependent upon the size of these openings, a small quantity of air may be sucked through the same upon the retraction or intake stroke of the piston, for the purpose above mentioned. At any rate, the mixture which leaves the resilient element is completely emulsified and may be collected in a suitable chamber and used as cream. By this simple operation, cream can be conveniently produced in the home from milk and butter. Since the latter are both much cheaper than cream, the utility of the invention will be perceived, and the ease with which the character of materials can be altered is an added advantage.

Referring in detail to the drawing, 10 denotes a device embodying the invention. The same may include a container or bowl 11, and a suitable support or stand 12 therefor. Associated with the bowl is a suitable pump 13 actuated by any feasible means which may include a rotary handle 14. The emulsified product is delivered through an outlet or nozzle 15 into a cup or other container, not shown, and which may, for convenience be disposed under the support 12.

More particularly, I may provide a pump 13 of the reciprocatory type having a cylinder 16 in central coaxial relation with the container 11, and integral therewith. The cylinder 16 may be open at the top 17 and may extend above and project below the bottom wall 18 of the container 11. The lower end of the cylinder 16 may be closed ended by an integral wall 19, through which may extend a series of small holes 20 for a purpose hereinafter described. The upper portion of the cylinder may have a plurality of series of holes 21, 22 at different elevations in relative proximity to the bottom 18 of the container.

Reciprocably mounted in the cylinder 16 is a piston 23, which may be substantially uniformly cylindrical throughout, and may snugly fit the cylinder 16. For actuating the piston, the handle 14 may be fixed to a shaft 24. The latter may be mounted in a pair of alined bearings 25, 26 integral with the container 11 and disposed along a diameter thereof. Intermediate the ends of the shaft, the same may have an offset or crank portion for actuating the piston. A simple manner of mounting this shaft in the bearings 25, 26 is to provide a bearing hole 28 in the lug 25, and to form the bearing 26 open, as by making the same of a pair of spaced lugs 29 between which the shaft may be dropped. To hold the shaft in the bearing 26, a cross pin 30 may be passed over the shaft 24 through the lugs 29. A set screw or collar 31 at the free end of the shaft, in conjunction with the handle, may hold the shaft against endwise movement.

Interconnecting the piston 23 with the shaft 24 is a connecting rod 32. The latter with a loose fitting hole for receiving the shaft, so that the same can be readily passed through the connecting rod, including the offset forming bends. To operatively maintain the connecting rod at the offset 27, the shaft 24 may be squeezed at a plurality of spaced points to provide grooves 33. Split or open washers 34 are sprung or clamped around the shaft in the grooves 33, and the resilient engagement may be facilitated by forming the washers of reduced width at 35. Thus the washers are disposed at opposite sides of the connecting rod 32 in parallel bearing relation therewith as shown in Figs. 1 and 2, to prevent the connecting rod from slipping laterally onto the bends at the offset of the shaft. To swingably attach the connecting rod to the piston 23, the latter may have an open ended diametral slot 36, to receive the adjacent end of the rod, and a pin 37 may be passed through alined holes in the connecting rod and in the lugs of the piston formed by the slot 36. Thus an oscillatable connection is provided.

To minimize or avoid leakage between the cylinder 16 and the piston 23 of the pump, the former may have a packing or rubber disc 38 centrally secured to the operating end thereof as by a washer 39 and screw 40 passing centrally through the washer and the disc and threaded into the piston. The disc 38 may have snug resilient wiping contact with the internal surface of the cylinder.

With the holes 20 providing the first stage of emulsification, a second stage may be afforded by a valvular means which is adapted to discharge the pump contents but to substantially close on the retraction stroke of the piston, and at the same time to cause the mixture of liquids to pass through an extremely fine passage whereby the emulsifying action is obtained. Instead of resorting to movable valves for this purpose, where such valves would have to be small and delicate, and operate with a high degree of mechanical precision, I utilize a disc which has one or more openings which open when the disc is deformed and which automatically closes when the disc returns to normal position. A resilient action of the disc is preferably used. The disc may be deformed in any suitable manner, preferably by the direct pressure of liquid thereagainst. Desirably, I employ a disc 41 of relatively thick rubber having one or more slits or holes 42 therethrough. In the position shown in Fig. 3, these openings may be wholly closed or open only to a microscopic or other small degree. In the position shown in Fig. 4, the openings are expanded to permit liquids to pass therethrough, the extent of the opening area depending upon the pressure on the liquids.

The disc 41 may be secured in place by the nozzle 15, which commingles the emulsion to provide a uniform product. The securement of the disc may be attained by seating the same against an annular lip 43 which extends from the cylinder 16 coaxially beyond the wall 19 to afford a rim or seat for the disc and space the latter from the wall 19. Thus a commingling chamber 44 is afforded. The nozzle 15 may have an annular seat or shoulder 45 for the disc 41, the inner diameter of this seat being larger than that of the lip 43, so that the disc 41 has more flexibility or latitude downward than upward. Further, the nozzle may have threaded connection at 46 with the lower end of the cylinder 16, and the outlet portion 47 of the nozzle may be alined with the pump and extend downward therefrom.

An important feature of the invention is that the rubber valve member 41 is not only constrained to operate within certain limits, but is arranged to resist undue extension of the openings therein, so as to assure a fine outlet and to safeguard against the effects of undue softening of the rubber. For this purpose, an annular backing or seating portion 47a is provided, which may be in the nature of an undercut, to limit downward deflection of the rubber member, and in fact, to tend to compress the rubber inward to prevent excessive opening up of the central hole 42. The side holes 42 may be relatively obstructed by the seat 47a, but, as they receive liquid under pressure, they tend to prevent undue expansion of the central hole.

To secure the container 11 on the stand 12, the lower portion of the pump cylinder may have a cylindrical surface 48 adapted to be downwardly received in a collar portion 49 of the stand 12, whose axis is vertical. From this collar portion extend downward the integral divergent legs 50 of the support. A thumbnut or set screw 51 threaded through a wall of the collar may abut the surface 48 to releasably secure the container 11 on the stand. To permit attachment and detachment of the container without removing the nozzle 15, the latter may be made sufficiently small in outside diameter to readily pass through the hub 49 of the support.

The manner of using the device 10 will now be described. The operator melts a suitable quantity of butter and mixes the same with a desired amount of milk, and places the mixture into the container 11. Then the handle 14 is rotated to rotate the shaft 24 and cause the connecting rod 32 to reciprocate the piston 23, this being continued as long as there is any liquid in the container 11. The liquid acts as a lubricant for the pump and improves the tightness thereof against leakage between the piston and cylinder. In the full retracted position of the piston shown in Fig. 3, liquid enters the cylinder through holes 21, 22 thereof. Upon the advance stroke of the piston the upper series of holes 22 are first closed, and a portion of the liquid in the cylinder is rapidly violently expelled through the lower holes 21 causing agitation of the liquid in the container 11, as well as of the liquid in the pump cylinder. This promotes a mixing and circulatory action. As the piston continues its advance stroke, the lower series of holes 21 are closed thereby, and the liquids in the cylinder are compressed and forcibly driven through the series of small outlet holes 20 to cause the butter and milk to be finely commingled and to produce a series of jets discharging into the chamber 44 in which eddy currents are caused by the jets. This completes the first stage of emulsification, and may be sufficient in itself. But now, the initially emulsified mixture is compressed against the disc 41 causing the same to concave outwardly and the openings 42 to become stretched or expanded to permit the mixture to flow therethrough. In this manner the mixture cannot be expelled except at a sufficiently high pressure which assures ample frictional contact and hence a breaking up of particles and emulsification of the mixture of liquids in the openings 42. Further the latter tightly embrace around and hug the thin streams of the mixture so that the latter is drawn into the particularly fine emulsion. Then the mixture is remixed and discharged for use through the orifice 47.

Agitation of liquids in container 11 may also be aided by the piston 23 directly, and a quantity of air may be sucked into the cylinder by reason of the agitated condition of the liquid. On the retraction stroke of the piston, a very small quantity of air may also be sucked into the cylinder through the openings in the disc 41, but insufficient to prevent the cylinder from receiving a full charge of liquid for the next cycle. The disc 41 flexes more readily downwardly than upwardly, and because of the elasticity of air, the disc is subject to less flexure upwardly than downwardly.

This method is applicable generally to the emulsification of liquids, and the openings 20 and 42 will vary in size with the viscosity of the liquids. For ordinary purposes, the openings 20 may be only one thirty second of an inch in diameter, and the openings 42 may be mere slits in a disc of approximately one sixteenth to one eighth of an inch in diameter. The openings 42 may open according to the viscosity of the mixture so that a thick liquid can be worked without breakage of the same and without requiring excessive power to manipulate the pump.

It will be appreciated that various changes and modifications may be made in the device as shown in the drawing, and that the same is submitted in an illustrative and not in a limiting sense, the scope of the invention being defined in the following claims. For instance, the pump may be motor driven, and obviously a series of pumps can be coupled to one drive shaft.

I claim:

1. An emulsifying device for a mixture of liquids including a pump, a container for supplying a mixture of liquids thereto, and outlet means for the pump including an element adapted to be resiliently concaved, said element having a normally closed hole opened by concaving the element, said element being adapted to be concaved by the force of the mixture of liquids to permit passage thereof and coincident emulsification of the mixture.

2. An emulsifying device for a mixture of liquids including a pump, a container for supplying a mixture of the liquids to the pump, and means through which the mixture compressed by the pump is adapted to be discharged subject to the pump pressure, said means including a screen adjacent to the pump, said screen having relatively fine openings, and an elastic composition element remote from the pump and having self closing openings adapted to be opened by the liquid pressure, said screen and element affording a mixing space therebetween for the liquids.

3. An emulsifying device including a pump, an emulsifying means communicating with the pump and through which a mixture of liquids can be forced by the pump, said means having a resilient element having a normally closed hole opened on deformation of the element, and supporting means for the element adapted to permit a greater degree of deformation of the element in one than in the opposite direction so that said hole will open substantially only to pass the mixture of liquids therethrough.

4. An emulsifying device including a container element adapted to receive under pressure materials that are to be emulsified, a rubber like plate, said element having means for marginally securing said plate in a fluidtight manner, said plate having a central opening and being free to deflect axially under pressure to cause the said opening to be opened, coincident with the radial stretching of the plate, and means spaced from the first mentioned means for limiting the deflection of the plate.

5. An emulsifying device according to claim 4, wherein the limiting means is coaxial with said opening and is substantially smaller in diameter than the first mentioned means so as to lie in proximity to said opening to cause the material of the plate to be deformed radially inward upon pressing on the limiting means, to thus resist undue extension of said central opening.

JOHN E. MARSDEN.